(12) United States Patent
Eichenbaum

(10) Patent No.: US 7,424,306 B2
(45) Date of Patent: Sep. 9, 2008

(54) APPARATUS FOR TEMPORARILY STORING PHONE NUMBERS AND SHORT MESSAGES

(76) Inventor: Joseph Eichenbaum, 150 Bennett St., Oceanside, NY (US) 11572

( * ) Notice: Subject to any disclaimer, the term of this patent is extended or adjusted under 35 U.S.C. 154(b) by 715 days.

(21) Appl. No.: 11/055,646

(22) Filed: Feb. 10, 2005

(65) Prior Publication Data
US 2006/0178164 A1 Aug. 10, 2006

(51) Int. Cl.
*H04Q 7/32* (2006.01)
(52) U.S. Cl. .................. 455/550.1; 455/566; 455/564; 455/412.1; 455/412.2; 455/466; 379/433.01; 379/433.04; 379/433.07; 379/433.06; 345/168; 345/169; 345/170; 345/172
(58) Field of Classification Search ............. 455/550.1, 455/564, 575.1, 566, 571, 572, 90.1, 90.2, 455/90.3, 466, 556.1, 556.2, 557, 551, 73, 455/422.1, 403, 500, 517, 412.1, 412.2; 379/433.01, 379/433.04, 433.06, 433.07; 345/168, 169, 345/170, 172, 553, 1.1
See application file for complete search history.

(56) References Cited

U.S. PATENT DOCUMENTS 4,117,542 A * 9/1978 Klausner et al. ............ 708/109
4,394,649 A * 7/1983 Suchoff et al. ............. 345/168
2004/0119685 A1* 6/2004 Harries et al. .............. 345/156

* cited by examiner

Primary Examiner—Keith T Ferguson
(74) Attorney, Agent, or Firm—Raymond M. Galasso; Galasso & Associates, L.P.

(57) ABSTRACT

An apparatus for temporarily storing phone numbers and short messages is disclosed. The apparatus includes a housing including electronics operable to receive an input and display a sequence of no more than seventeen characters in response to the input. The electronics include at least two electronic displays operable to display the sequence of no more than seventeen characters and a keypad operable to receive the sequence of no more than seventeen characters. The keypad includes twenty-six alphabetic keys, each alphabetic key representing a letter of the alphabet ranging from A to Z and ten numeric keys, each numeric key representing a single number ranging from zero (0) to nine (9). A clear key operable to clear the last character of the sequence of no more than seventeen characters and a processor is operably coupled to the at least two electronic displays and the keypad to convert the input into an alphanumeric character to be displayed by at least one of the two electronic displays.

20 Claims, 2 Drawing Sheets

APPARATUS FOR TEMPORARILY STORING PHONE NUMBERS AND SHORT MESSAGES

FIELD OF THE DISCLOSURE

The invention relates generally to electronic devices, and more particularly to an apparatus for temporarily storing phone numbers and short messages.

BACKGROUND

The simple task of taking a message or phone number may be complicated based on a user's environment where a note is to be taken. For example, a user may desire to take a short message or note but may lack resources such as a pen or paper to facilitate the activity. With the proliferation of mobile phones, individuals find themselves in random locations that may not allow them to have access to a pen or paper. Moreover, some users may have a difficult time taking a note based on their mobile situation rendering the note illegible. For example, a user may be walking or driving a vehicle when a note is to be taken. In such a situation, a user would need to slow down or stop a vehicle to take a note or risk creating a hazardous situation. A vehicle operator would need to divert their vision to search for a pen and paper and may be further distracted while writing a note.

There are also several additional disadvantages to writing short messages, phone numbers, etc. For example, natural resources may be expended as a by-product of note taking requiring individuals to re-purchase paper products, pencils, pens, etc. Additionally, from time-to-time individuals may need to consolidate notes or phone numbers until they are needed. For example, if separate pieces of paper are used to temporarily store a note or phone number, they may be misplaced before they are needed leading to lost information and an inefficient use of time. As such, an apparatus that will allow a user to safely and efficiently take short messages and/or phone numbers without expending or wasting resources is desired.

BRIEF DESCRIPTION OF THE DRAWINGS

Other advantages, features and characteristics of the invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE FIGURES

Figure 1:
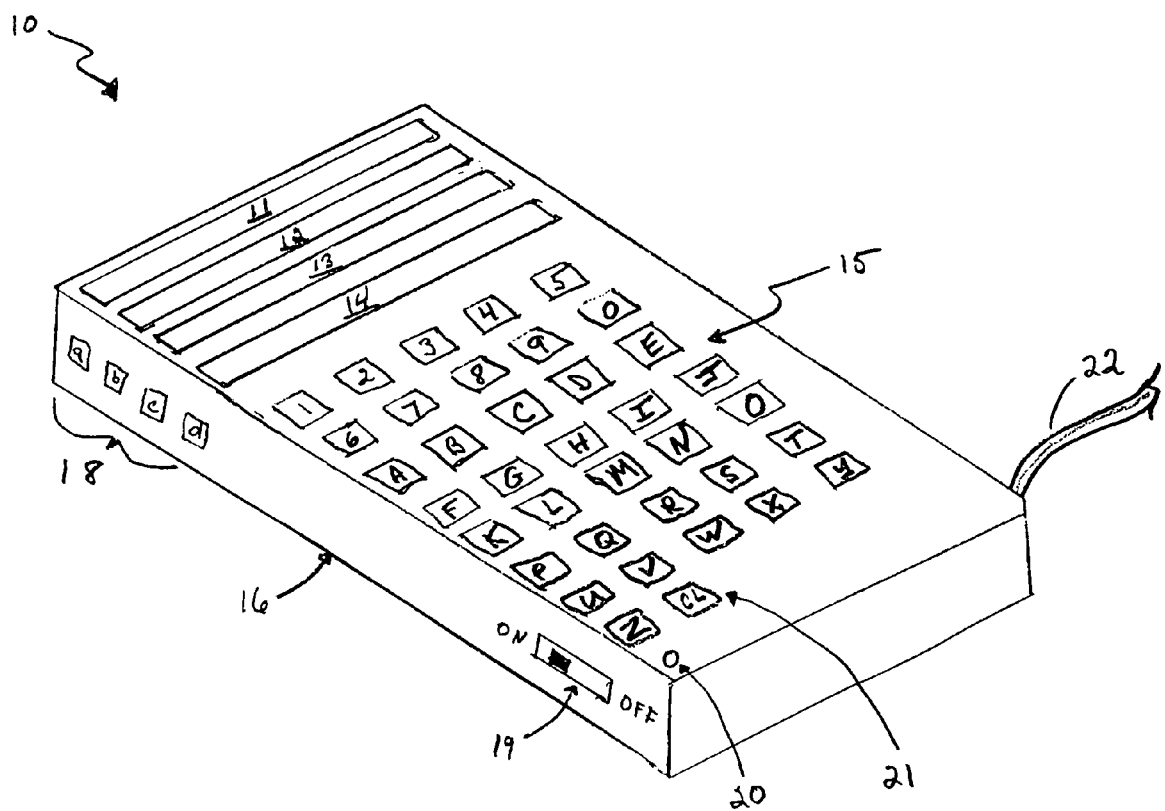
FIG. 1 illustrates an electronic device for temporarily storing phone numbers and short messages according to one embodiment of the invention.

An apparatus for temporarily storing phone numbers and short messages is provided. The apparatus includes a housing including electronics operable to receive an input and display a sequence of no more than seventeen characters in response to the input. The electronics include at least two electronic displays operable to display the sequence of no more than seventeen characters and a keypad operable to receive the sequence of no more than seventeen characters. The keypad includes twenty-six alphabetic keys, each alphabetic key representing a letter of the alphabet ranging from A to Z and ten numeric keys, each numeric key representing a single number ranging from zero (0) to nine (9). The keypad further includes a clear key operable to clear the last character of the sequence of no more than seventeen characters. The apparatus further includes a processor operably coupled to the at least two electronic displays and the keypad, the processor operable to convert the input into an alphanumeric character to be displayed by at least one of the two electronic displays and a memory operable to store the sequence of no more than seventeen characters. A low-voltage power supply is coupled to the electronics and operable to provide power to the electronics.

In another form, a method for temporarily storing phone numbers and short messages is disclosed. The method includes receiving an input of no more than seventeen alphanumeric characters using an electronic device including a housing having electronics associated with receiving and storing a sequence of no more than seventeen alphanumeric characters. The housing includes a display module including four electronic displays operable to display a sequence of no more than seventeen alphanumeric characters and a keypad having twenty-six alphabetic keys, each key representing a letter (A-Z) of the alphabet and ten numeric keys, each key representing a number ranging from zero (0) to nine (9). The keypad further includes a clear button operable to clear the last character of the sequence of characters when displayed by one of the four electronic displays. The housing further includes a processor operably coupled to the display module and the keypad, the processor operable to convert a keypad input into a character to be displayed within at least one of the displays and a memory operable to store the sequence of alphanumeric characters. The housing further includes at least four program switches operably coupled to each of the four displays and operable to initiate storing the sequence of characters into a specific memory location within the memory and a power supply operable to provide power to the electronics. The method further includes storing the sequence of no more than seventeen alphanumeric characters within the memory location in response to a user selecting the program button within the memory.

In another embodiment of the invention, an apparatus for temporarily storing phone numbers and short messages includes a housing having electronics operable to receive an input and display a sequence of no more than seventeen characters in response to the input. The electronics include two electronic displays operable to display a sequence of no more than seventeen alphanumeric characters and a keypad including twenty-six alphabetic keys, each representing a letter of the alphabet (A-Z); and ten numeric keys, each key representing a single number ranging from zero (0) to nine (9). The keypad further includes a clear key operable to clear the last character of the sequence of characters. The apparatus further includes a processor operably coupled to the two electronic displays and the keypad, the processor operable to convert a keypad input into a character to be displayed as a portion the sequence of characters within the at least one of the two displays and a memory operable to store the sequence of alphanumeric characters. A low-voltage power supply is provided to power to the electronics.

In a further embodiment, an apparatus for temporarily storing phone numbers and short messages is provided and includes a housing having electronics operable to receive an input and display a sequence of no more than seventeen characters in response to the input. The apparatus further includes the electronics having four electronic displays operable to display a sequence of no more than seventeen alphanumeric characters and a keypad having twenty-six alphabetic keys, each representing a letter of the alphabet (A-Z) and ten numeric keys, each key representing a single number ranging from zero (0) to nine (9). The keypad further includes a clear button operable to clear the last character of the sequence of characters. The apparatus further includes a processor operably coupled to the four electronic displays and the keypad, the processor operable to convert a keypad input into a character and display a graphical representation of the character within one of the four displays and a memory operable to store the sequence of alphanumeric characters. The apparatus includes a power supply operable to provide power to the electronics and a series of four erase switches, each switch electronically coupled to one of the four displays and the memory and operable to clear the one of the four displays and a portion of the memory. The apparatus further includes a backlight operably associated with one or more of the displays and operable to illuminate the at least one or more of the displays.

FIG. 1 illustrates an electronic device for temporarily storing phone numbers and short messages according to one embodiment of the invention. An electronic storage device 10 includes a housing 16 formed of a durable plastic material such as a high-impact durable plastic material and is formed generally as a rectangular-shaped housing. In one embodiment, housing 16 is formed to include a width of approximately is three (3) to four (4) inches, a height of approximately four (4) to five (5) inches, and a width or thickness of approximately one-quarter (¼) inch. Housing 16 may be formed using one or more plastic manufacturing processes. For example, a plastic manufacturing process of injection molding or blow molding may used to form housing 16. Injection molding is a process that is used in mass production of materials and include melted plastic being forcefully injected into a relatively cool mold. As the plastic material hardens, it takes on the shape of the mold cavity. One skilled in the art can appreciate that other methods of forming housing 16 may also be used either alone or in combination with the methods described above. Additionally, other shapes and dimensions may be selected for forming housing 16 as desired.

Electronic storage device 10 also includes a power switch 19 and associated power indicator 20 operably coupled to a power source (not expressly shown) such as one or more batteries and/or an AC power source or adaptor (not expressly shown) coupled via insulated power cord 22. AC power adaptors allow an AC power source to be converted into a direct current power for powering electronic storage device 10 and/or recharging a power source of electronic storage device 10. An AC adapter may be provided internal or external to housing 16. Electronic storage device 10 further includes a keypad 15 having alphanumeric keys labeled with letters or numbers and program switches 18 operable to program or initiate storing of a short message or phone number displayed in a respective display. For example, program switch 18a is associated with first display 11, program switch 18b is associated with second display 12, program switch 18c is associated with third display 13 and program switch 18d is associated with fourth display 14. Activation of a respective program switch stores the contents or data displayed within a respective display into memory of electronic storage device 10. Each display is configured to display up to seventeen (17) characters using a grayscale liquid crystal display (LCD) elements. However, other types or combinations of displays or display elements (i.e. color displays, light emitting diodes (LEDs), thin film transistors (TFTs), etc.) may also be used.

During operation, when power switch 19 is placed in the 'ON' position, electronic storage device 10 is initialized and LED 20 is illuminated to indicate that electronic storage device 10 is powered on. A user may then select a program switch to display and store a short message or phone number. For example, a user desiring to store a number within first display 11 would activate program switch 18a. Upon activating program switch 18a for first display 11, electronic storage device 10 would populate first display 11 with any previously stored data if present. For example, if the phone number "123-456-7890" were previously stored for first display 11, electronic storage device 10 would display the previously stored number. Data presented within first display 11 may then be edited or cleared through a user selecting clear key 21 to erase characters displayed within first display 11 and new characters may be entered accordingly through a user entering characters using keypad 15. If a user desires to erase all of the contents of first display 11, a user may select an associated erase switch (not expressly shown) to clear all of the data displayed within first display 11.

Upon clearing the data if desired, a user may select a key using keypad 15 to enter specific characters within an activated display. For example, if second display 12 is placed in an active or on state, a user may enter up to seventeen (17) characters ranging from 'A to Z' and/or combinations of numbers ranging from 'zero (0) to nine (9)'. Upon entering a string of up to seventeen (17) characters, a user may then store the character string temporarily within programmable memory (not expressly shown) of electronic storage device 10 through activating an associated program switch for the display being used. For example, if a user entered a character string within second display 12, a user would activate program switch 18b and the contents displayed within display 12 would be stored within memory. In one embodiment, a confirmation message, such as "MESSAGE STORED" may also be displayed within display 12 to indicate a message had been successfully stored. As such, electronic storage device 10 provides a simple-to-use user interface having minimal operating buttons to allow for efficient programming and display of short messages and phone numbers. Such a user interface includes intuitive program/erase/display functionality of each display that allows for easy access, display and storage of short notes or phone numbers without a user having to navigate through complex graphical user interfaces of some conventional electronic storage devices.

In one embodiment, electronic storage device 10 may be provided to include only two displays thereby providing a reduced or smaller version of an electronic storage device. For example, each of the two displays may include a reduced number of displayable characters (i.e. twelve (12) characters or less) or character sizes or different sized character fonts. In this manner, electronic storage device 10 may be provided in a reduced size having a smaller housing 16 (i.e. pocket sized), reduced number components, reduced power requirements (i.e. low-voltage DC power), etc. allowing for easier portability, storage, and mounting. In one form, electronic storage device 10 may be sized similarly to a conventional simple portable calculator such as a calculator that includes a reduced set of functions such as addition, subtraction, multiplication, division and memory storage.

In one form, electronic storage device 10 may be provided with a adhesive strip (not expressly shown) coupled to a portion of housing 16 to allow for mounting of electronic storage device 10 at various locations. For example, a user may desire to mount electronic storage device 10 to a wall, dashboard or console of an automobile, a table or desk, a portion of a telephone, portable telephone, cellular phone, or other location. In another embodiment, a hook and loop material may also be used to allow for increased portability and mounting of electronic storage device 10.

Figure 2:
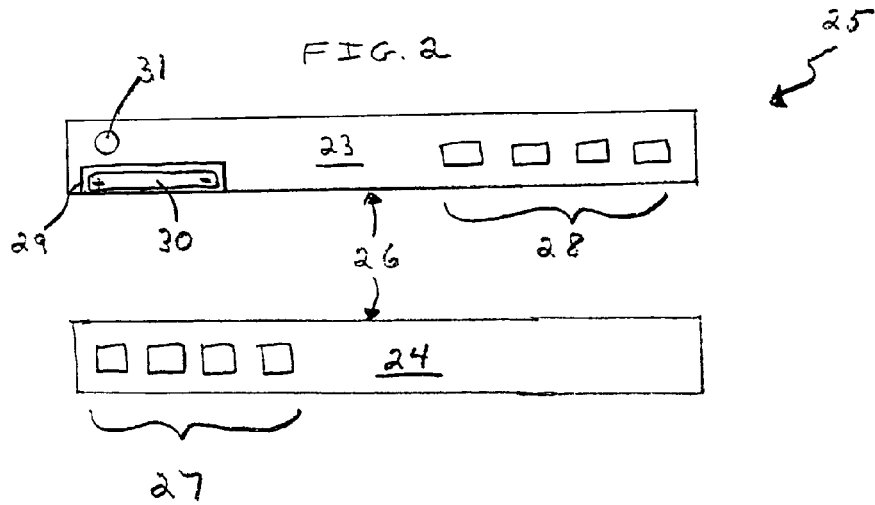
FIG. 2 illustrates side perspective views of an electronic device for temporarily storing phone numbers and short messages according to one embodiment of the invention.

FIG. 2 illustrates a side perspective view of an electronic device for temporarily storing phone numbers and short messages according to one embodiment of the invention. Electronic storage device 25 is similar to electronic storage device 10 of FIG. 1. Electronic storage device 25 includes a housing 26 having a right hand side portion 23 including a plurality of erase switches 28 operably coupled to plural display portions (not expressly shown). Housing 26 further includes a battery compartment 29 for housing a low-voltage battery 30 for powering electronic storage device 25. In one embodiment, low-voltage battery 30 may include a low-voltage direct current or DC batteries ranging between 1.5 volts and nine volts depending on the functional complexity, longevity of use, number of displays, etc. of electronic storage device 25. For example, DC batteries such as AA, AAA, etc. may be employed. Other direct current battery sizes may also be considered such as one or more conventional watch batteries. Charge port 31 is provided for recharging rechargeable batteries if used and may be connected to an external power source operable to provide power sufficient to recharge rechargeable batteries if used. Battery housing 29 further includes metal contacts positioned along battery housing 29 to contact a specific region of battery 30 and assists with conducting power to associated electronic components stored within housing 26 (not expressly shown).

In one embodiment, electronic storage device 25 may include an auto-off or timer feature operable to turn off electronic storage device 25 if not used for a period of time. For example, if a user does not use electronic storage device 25 which may include selecting at least one key, program button, or erase button within a specific period of time (i.e. sixty seconds, one hundred twenty seconds, etc.), electronic storage device 25 is placed in an "OFF" operating state providing minimal power to components as needed. In this manner, reduced depletion power stored within battery 30 may be realized. In another embodiment, a voltage regulator (not expressly shown) may be provided to determine a voltage level of battery 30 and display a message accordingly. For example, if a 1.5 Volt battery is reduced to less than 1.2 Volts, electronic storage device 25 may display a "BATTERY LOW" message within one or more display of electronic storage device 25.

Electronic storage device 25 further includes a plurality of program switches 27 positioned along left hand side portion 24 of housing 26 and operably coupled to a display (not expressly shown). Program switches 27 allow for programming or storing of data within programmable memory (not expressly shown) of electronic storage device 25. In the embodiment illustrated in FIG. 2, electronic storage device 25 multiple state program switches 27 that allow for select display elements to be activated and powered based on a user selecting a program switch 27. For example, electronic storage device 25 may be in an "OFF" operating state meaning that little or no power is being distributed or consumed by electronic components housed within housing 26 and actively computing, processing, operating, etc. When a user selects a program switch 27 while in the "OFF" state, sufficient power is distributed among electronic components of electronic storage device 25 as needed and if a previously stored string of characters were stored in programmable memory, an associated display is populated with the stored contents of the associated display and displayed to the user for viewing. In one embodiment, a backlight for the selected display may also be illuminated. Upon activating a selected display, the display is placed in a "PROGRAM" operating state and a user may then clear a string of characters using an associated erase button 28 and/or enter a string of characters within the associated display. Upon a user entering and/or editing the character string, a user may then select the associated program button 27 for the display and the contents of displayed within the associated display is stored within programmable memory of electronic storage device 25. A user may then activate the associated program button 27 for the display to return the display to an "OFF" operating state. If no other displays are currently in an "ON" or "PROGRAM" operating state, electronic storage device 25 will be returned to an "OFF" operating state providing minimal power required to maintain data stored within programmable memory of electronic storage device 25 if required. In this manner, a user may selectably power on a display as desired and view, edit, delete, save messages for a selected device as desired.

Erase switches 28 allow for clearing or removing of content or data displayed within an associated display. For example, the embodiment illustrated in FIG. 2 includes four program switches 27 and four erase switches 28 wherein each switch is operably coupled to a one of each of four displays (not expressly shown). As such, upon activation of an erase or program switch, data associated with a respective display is erased or programmed.

Figure 3:
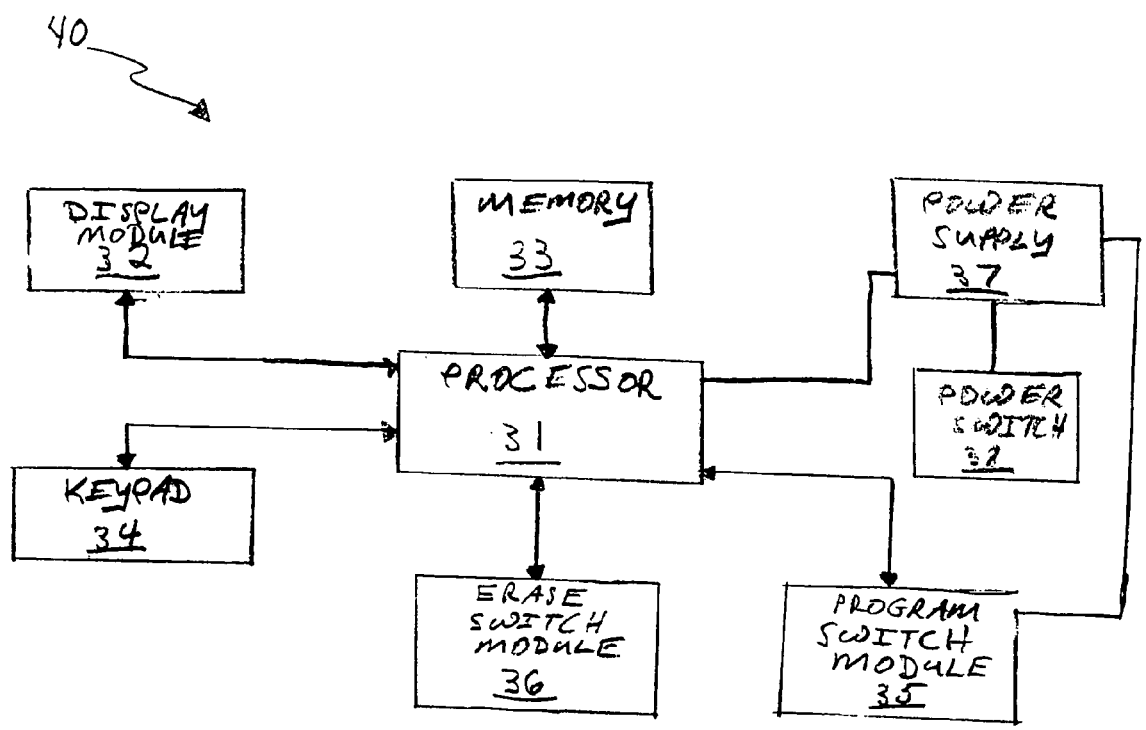
FIG. 3 illustrates a functional block diagram of an electronic device for temporarily storing phone numbers and short messages according to one embodiment of the invention.

FIG. 3 illustrates a functional block diagram of an electronic device for temporarily storing phone numbers and short messages according to one embodiment of the invention. Electronic storage device, illustrated generally at 40, includes a processor 31 operable as a controller for controlling and processing data or inputs to electronic storage device 40. Processor 31 may be a include a mirocprocessor or microcontroller for controlling and processing data. For example, a single-chip microcomputer with on-board program read only memory (ROM) and input/output (I/O) can be programmed for various control functions and may be provided as a single chip or electronic circuit that includes all or most of the parts needed for a controller including a CPU (central processing unit), RAM (Random Access Memory), EPROM/PROM/ROM (Erasable Programmable Read Only Memory), I/O (input/output)—serial and parallel timers and an interrupt controller. Providing features specific to a task (control) ensuring cost is relatively low. A typical microcontroller has bit manipulation instructions, easy and direct access to I/O (input/output), and quick and efficient interrupt processing.

Electronic storage device 40 further includes a display module 32 operable to enable one or more displays for displaying a string of alphanumeric characters using one or more types of display types such as liquid crystal diodes (LCDs), light emitting diodes (LEDs), thick film transistor (TFT) displays, and the like. Memory 33 may include RAM, ROM, EPROM, EEPROM, Flash Memory, or other types of memory and/or programmable memory as needed. Electronic storage device 40 further includes a keypad 34 for inputting data into electronic storage device 40 and includes alphanumeric keys with a single key for each letter of the English alphabet (A to Z) and a single key for numbers ranging between zero (0) and nine (9). Electronic storage device 40 further includes one or more program switch module 35 and erase switch module 36 operable associated with display module 32 and selective display portions to store and erase alphanumeric data displayed within a display portion of display module 32. Display module 32 includes logic for enabling display of alphanumeric characters. A low-voltage power supply 37 provides power to each component of electronic storage device 40 that requires power and may include one or more power buses provided through various voltage regulators, converters, etc. as needed. For example, in one embodiment a single voltage level (i.e. 1.5 Volts) may be used by all components illustrated in FIG. 3 however in other embodiments, various levels such as 0.5 Volts, 1.5 Volts and 3.3 Volts may be used depending on the type of component(s) used by electronic storage device 40.

During operation, processor 31 initializes electronic storage device 40 and ensures that each component is functioning properly. For example, processor 31 may include an initialization sequence or routine that is used to initialize each electronic component of electronic storage device 40 to determine an operating or functional status of each component. Such initialization routine may include receiving a predetermined voltage level at an input port (not expressly shown) of processor 31 in response to initializing each component. Other types of initialization routines may also be employed.

Electronic storage device 40 may also include a communication bus (not expressly shown) for communicating data or information between components. For example, processor 31 may request information stored at a specific location within memory 33 and as such a request for information may be processed by a memory controller of memory 33. Contents of the memory location may be placed on a communication bus for use by other components of electronic storage device 40. For example, display module 32 may read data provided on a communication bus for displaying data read from memory 33. Communication buses and operations thereof are well know in the art.

In one embodiment, processor 31 may access memory 33 to determine data previously stored in memory. For example, if a user had previously entered data that was displayed within one or more display portions of display module 32 and programmed or stored within memory 33, processor 31 may access a specific portion or memory address of memory 33 to determine contents at a specific memory address and populate or display the contents of the memory address in a specific portion of display module 32. In this manner, a specific memory address may be associated with a specific display portion of display module 32 and processor 31 may initiate access to the contents or information stored within a specific memory location memory 33 enable displaying contents to a user within a specific display portion of display module 32. In this manner, a specific display portion of display module 32 may be associated with a specific memory address of memory 33 and a specific program switch of program switch module 35 and a specific erase switch of erase switch module 36 for managing information input to electronic storage device 40. Other memory storage techniques may also be employed for storing information within memory 33 including using fixed fields, variable fields, compressed storage, etc. Memory 33 may include various types of memory controllers or non at all for maintaining data or information. Such techniques are well known in the art.

During operation, a user may activate power switch 38 or one of program switches 35 to initialize or enable electronic storage device 40 and upon activation and an initialization sequence if needed. If power switch 38 is employed to power on electronic storage device 40, power supply 37 provides power or enables each component of electronic storage device 40. In one embodiment, electronic storage device 40 may not include power switch 38 and may be initialized through a user selecting one of the program switches of electronic storage device 40. A signal may be provided to processor 31 and/or power supply 37 indicating that a program switch had been activated. Power supply 37 may provide or distribute power to each electronic component to initialize each component. Upon initialization, processor 31 may determine which switch had been activated and determine contents of memory 33 to display within a display portion of display module 32 based on the selected program switch of program switch module 35. Additionally, only one display portion of display module 32 associated with the selected program switch of program switch module 35 may be powered and/or initialized thereby reducing power consumption that may occur through powering up each display portion of display module 32.

A user may activate one or more switches for inputting or erasing data displayed by display module 32. For example, if a portion of display module 32 includes data no longer desired, a user may activate an erase switch of erase switch module 36 operably associated with specific display portion of display module 32 to erase the contents displayed by display module 32 and an associated memory location of memory 33. For example, upon activation of an erase switch, a signal is sent to processor 31 indicating that an erase switch for a specific display element has been activated and the memory contents may be erased and an associated display portion of display module 32 may be cleared or reset. In one embodiment, a confirmation message such as "ERASE CONTENTS 'Y' or 'N'" may be displayed allowing a user to confirm that a message is going to be erased. Default messages for assisting user interaction may be stored within memory 33 and processor 31 may access messages based on the user's interaction with electronic storage device 40.

A user may input and edit a message using keypad 34 and for a selected display portion of display module 32. For example, a user may activate a display portion of display module 32 using a program switch of program switch module 35. Program switch module 36 is provided in association with a single display element or display portion and enables managing, editing, entering, erasing, clearing, storing data for a selected display portion or display element. Upon a user selecting a program switch associated with a specific display, processor 31 enables keypad 34 and enabling a user to enter a short alphanumeric message. For example, a selected display portion of display module 32 may only be able to display up to seventeen (17) characters. Other embodiments may allow include a display portion of various sizes (i.e. 10 characters, 12 characters, 20 characters, etc.). In one embodiment, a message that exceeds the number of display characters may be entered and displayed by electronic storage device in a banner or scrolling manner allowing a user to view an entire message using a display portion having a limited number of display characters. Other combinations of displaying data or short messages may also be considered.

Keypad 34 includes a single key for each letter of the alphabet (A to Z) and a single key representing a single digit (0 to 9). Keys for other character types may also be considered in various embodiments of the invention including, but not limited to, QWERTY keys of a conventional QWERTY keyboard. In another embodiment, keypad 34 may include a reduced set of keys similar to a telephone or cellular phone keypad. Electronic storage device 40 may include logic to enable a user to enter messages through use of a standard telephone keypad where each number key includes an associated alpha character or group of alpha characters. For example, the "2" key of telephone keypad includes alpha characters "ABC" provided in association with the "2" key. A user may then access each letter by sequentially selecting the "2" key based on the position of the character. For example, a user may select the "2" key twice and the letter "B" may be populated within the display. Electronic storage device 40 may also include other logic to auto-populate characters and words (T9 logic) based on a users interaction with keypad 34.

Keypad 34 further includes a clear key or backspace key allowing a user to edit characters entered and displayed by display module 32. A user may select a clear key and the last character displayed in the string of characters would be erased. Upon a user finishing entering a short message or phone number, a user may depress an associated program switch of program switch module 35 and processor 31 stores data input by keypad 34 within memory 33. For example, display module 32 may include a temporary memory for temporarily storing characters input by a user. In another embodiment, memory 33 may include a temporary storage location for temporarily storing an input character string. Upon a user selecting a program switch for a specific display, processor 31 initiates a memory store function placing the input string within memory 33 for the specific display portion. In one embodiment, upon selecting a program switch 35, data displayed by display module 32 may remain within the display until a user powers off electronic storage device 40. In another embodiment, upon a user selecting a program switch, processor 31 may display a confirmation message such as "MESSAGE STORED" to the user indicating that the message has been stored.

In one embodiment, a user may inadvertently power off electronic device 40 without storing information input and displayed by display module 32. For example, processor 31 may determine if data displayed by display module 32 has been stored and may present a user with an option to store the contents prior to powering electronic device 40 to an off state. For example, if data had not been stored, electronic storage device 40 may display a message such as "STORE INPUT?" to the user allowing the user to manually store the input as desired. In this manner, data that may have been input to electronic storage device 40 may be saved if desired by the user.

Note that although an embodiment of the invention has been shown and described in detail herein, along with certain variants thereof, many other varied embodiments that incorporate the teachings of the invention may be easily constructed by those skilled in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the invention is not intended to be limited to the specific form set forth herein, but on the contrary, it is intended to cover such alternatives, modifications, and equivalents, as can be reasonably included within the spirit and scope of the invention.

What is claimed is:

1. An apparatus for temporarily storing phone numbers and short messages comprising:
    a housing including electronics operable to receive an input and display a sequence of no more than seventeen characters in response to the input, the electronics including:
    at least two electronic displays operable to display the sequence of no more than seventeen characters;
    a keypad operable to receive the sequence of no more than seventeen characters comprising:
        twenty-six alphabetic keys, each alphabetic key representing a letter of the alphabet ranging from A to Z;
        ten numeric keys, each numeric key representing a single number ranging from zero (0) to nine (9); and
        a clear key operable to clear the last character of the sequence of no more than seventeen characters; and
    a processor operably coupled to the at least two electronic displays and the keypad, the processor operable to convert the input into an alphanumeric character to be displayed by at least one of the two electronic displays;
    a memory operable to store the sequence of no more than seventeen characters; and
    a low-voltage power supply coupled to the electronics and operable to provide power to the electronics.

2. The apparatus as recited in claim 1 further comprising a series of two erase switches, each erase switch operably coupled to a single display of the two electronic displays and operable to initiate clearing contents displayed within the single display.

3. The apparatus as recited in claim 1 further comprising a series of two program switches, each program switch operably coupled to a single display of the two electronic displays and operable to initiate storing contents displayed within the single display within the memory.

4. The apparatus as recited in claim 3 further comprising a backlight operably associated with at least one of the displays to illuminate the at least one of the displays.

5. The apparatus as recited in claim 1 further comprising:
    a series of two erase switches positioned along a first side of the housing and aligned with each of the two electronic displays, each erase switch operably coupled to a single display of the two electronic displays and operable to initiate clearing the contents of the single display; and
    a series of two program switches positioned along a second side of the housing and aligned with each of the two electronic displays, each program switch operably coupled to a single display of the two electronic displays and operable to initiate storing the contents of the single display within the memory.

6. The apparatus as recited in claim 5 further comprising an adhesive material coupled to a rear portion of the housing and operable to mount the housing to a fixture.

7. The apparatus as recited in claim 1 wherein the housing includes:
    a length of approximately five (5) inches;
    a width of approximately three and a half (3.5) inches; and
    a height of approximately one half (0.5) inch.

8. The apparatus as recited in claim 1 wherein the power supply includes a rechargeable power supply operable to be coupled to an external power source to recharge the rechargeable power supply.

9. The apparatus of claim 1 wherein each of the two displays includes seventeen liquid crystal display elements operable to display a single alphanumeric character.

10. The apparatus as recited in claim 1 further comprising each display operable to display a sequence of no more than twelve characters.

11. A method for temporarily storing phone numbers and short messages comprising:
    receiving an input of no more than seventeen alphanumeric characters using an electronic device comprising:
        a housing including electronics associated with receiving and storing a sequence of no more than seventeen alphanumeric characters, the housing including:
            a display module including four electronic displays operable to display a sequence of no more than seventeen alphanumeric characters;
            a keypad comprising:

twenty-six alphabetic keys, each key representing a letter (A-Z) of the alphabet;

ten numeric keys, each key representing a number ranging from zero (0) to nine (9); and a clear button operable to clear the last character of the sequence of characters when displayed by one of the four electronic displays; and a processor operably coupled to the display module and the keypad, the processor operable to convert a keypad input into a character to be displayed within at least one of the displays;

a memory operable to store the sequence of alphanumeric characters;

at least four program switches operably coupled to each of the four displays and operable to initiate storing the sequence of characters into a specific memory location within the memory;

a power supply operable to provide power to the electronics; and storing the sequence of no more than seventeen alphanumeric characters within the memory location in response to a user selecting the program button within the memory.

12. The method as recited in claim 11 further comprising:
detecting selection of a first program switch; and
determining a display associated with the detected first program switch.

13. The method as recited in claim 11 further comprising:
detecting selection of an erase switch;
determining an associated display;
clearing the contents of the associated display; and
removing the contents from the memory.

14. The method as recited in claim 11 further comprising:
determining if one of the at least four displays is in an operating state;
enabling the one of the at least four displays based on the operating state;
accessing the memory to determine content to display within the one of the at least four displays; and
displaying the-content within display.

15. An apparatus for temporarily storing phone numbers and short messages comprising:

a housing including electronics operable to receive an input and display a sequence of no more than seventeen characters in response to the input, the electronics including:

two electronic displays operable to display a sequence of no more than seventeen alphanumeric characters;

a keypad comprising:
twenty six alphabetic keys, each representing a letter of the alphabet (A-Z);

ten numeric keys, each key representing a single number ranging from zero (0) to nine (9); and a clear key operable to clear the last character of the sequence of characters; and a processor operably coupled to the two electronic displays and the keypad, the processor operable to convert a keypad input into a character to be displayed as a portion the sequence of characters within the at least one of the two displays;

a memory operable to store the sequence of alphanumeric characters; and a low-voltage power supply operable to provide power to the electronics.

16. The apparatus of claim 15 wherein each of the two electronic displays comprise:

two program switches operably coupled to separate displays of the two electronic displays to initiate storing a displayed sequence of characters in the memory; and two erase switches operably coupled to separate displays of the two electronic displays to initiate erasing a displayed sequence of characters from the memory.

17. The apparatus of claim 16 further comprising:
display means for displaying the characters within at least one of the two displays;
input means for inputting the characters to be displayed by the at least one the two displays;
erase means for erasing the characters from the memory;
program means for initiating saving the characters within the memory; and
storage means for storing the characters within the memory.

18. An apparatus for temporarily storing phone numbers and short messages comprising:

a housing including electronics operable to receive an input and display a sequence of no more than seventeen characters in response to the input, the electronics including:

four electronic displays operable to display a sequence of no more than seventeen alphanumeric characters;

a keypad comprising:
twenty-six alphabetic keys, each representing a letter of the alphabet (A-Z);

ten numeric keys, each key representing a single number ranging from zero (0) to nine (9); and a clear button operable to clear the last character of the sequence of characters; and a processor operably coupled to the four electronic displays and the keypad, the processor operable to convert a keypad input into a character and display a graphical representation of the character within one of the four displays;

a memory operable to store the sequence of alphanumeric characters;

a power supply operable to provide power to the electronics;

a series of four erase switches, each switch electronically coupled to one of the four displays and the memory and operable to clear the one of the four displays and a portion of the memory; and a backlight operably associated with one or more of the displays and operable to illuminate the at least one or more of the displays.

19. The apparatus of claim 18 further comprising a series of four program switches, each program switch electronically coupled to one of the four displays and the memory and operable to store the sequence of no more than seventeen alphanumeric characters within the memory.

20. The apparatus of claim 19 further comprising the processor operably coupled to the program switches and the erase switches to determine whether to store or erase contents of the memory.

* * * * *